April 24, 1934.      H. GRÜSS      1,956,386
HYGROMETER
Filed Feb. 15, 1930

Inventor
Heinz Grüss
by Louka & Kehlenbeck
Attorneys

Patented Apr. 24, 1934

1,956,386

UNITED STATES PATENT OFFICE 1,956,386

HYGROMETER

Heinz Grüss, Berlin-Staaken, Germany, assignor to Siemens & Halske, Aktiengesellschaft, Siemensstadt, near Berlin, Germany, a corporation of Germany Application February 15, 1930, Serial No. 428,614
In Germany February 20, 1929

10 Claims. (Cl. 73—24)

My invention relates to apparatus for measuring humidity, and particularly to hygrometers operating on the psychrometric principle to furnish a direct indication of the relative humidity of the air.

The object of my invention is to enable relative humidity to be determined with great accuracy over a much greater range of temperature than possible hitherto, and the improved apparatus is efficient for carrying out measurements at a distance.

The principle in the operation of my improved apparatus consists in producing an electric current which varies in accordance with variations of dry bulb temperatures, and another current which varies in accordance with variations in the difference between wet bulb and dry bulb temperatures, and utilizing the ratio of these two electric currents as a criterion or measure of the relative humidity.

The invention will now be described in detail with reference to the accompanying drawing, and the features of novelty pointed out in the appended claims.

Figure 1:
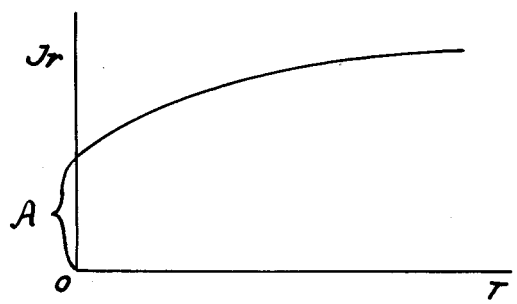
Figure 2:
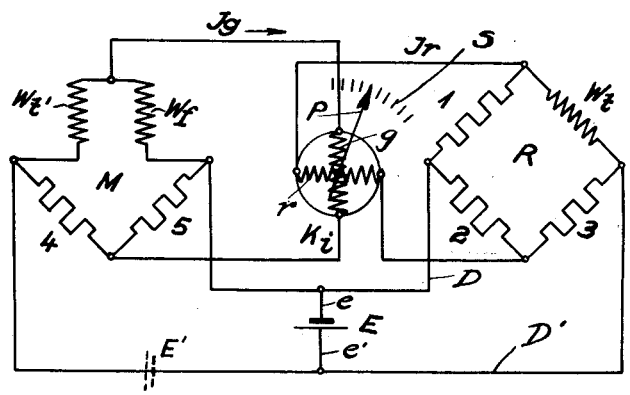
Figure 3:
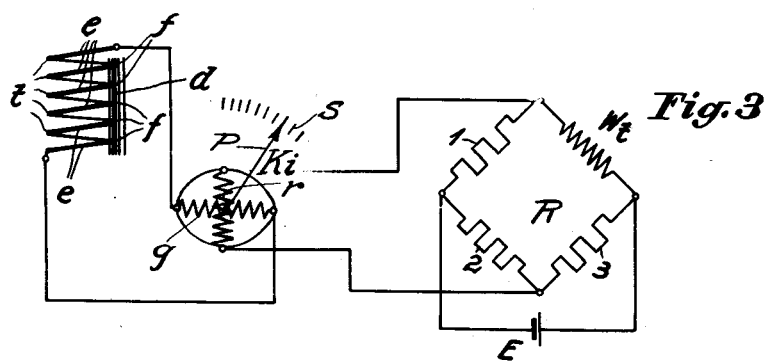

In said drawing, Fig. 1 is a graph illustrating certain relations of current and temperature explained below; Fig. 2 shows, as an example, an embodiment of my improved apparatus employing two Wheatstone bridges; and Fig. 3 shows another example of my invention employing a single Wheatstone bridge.

In Fig. 2, R is a Wheatstone bridge one arm of which contains a dry resistance thermometer $W_t$ the resistance of which varies in response to temperature changes, in a well-known manner; a second arm of the bridge, adjoining the first mentioned arm, contains a comparison resistance 1, while the other two arms of the Wheatstone bridge R contain two resistances 2, 3 respectively, the three resistances 1, 2, 3 being of such a character as not to be affected by temperature changes. $K_1$ designates a cross-coil measuring or indicating instrument of a well-known type, comprising a directional coil $r$ and a deflecting coil $g$ both held to swing in unison with each other and with a pointer P indicating on a stationary scale S. The directional coil $r$ is arranged in that diagonal circuit $J_r$ of the Wheatstone bridge R which connects the junction point of the arms containing the dry resistance thermometer $W_t$ and the resistance 1 respectively, with the junction point of the arms containing the resistances 2 and 3 respectively.

M designates the second Wheatstone bridge, one arm of which contains a dry resistance thermometer $W_t'$, while an adjoining arm contains a wet resistance thermometer $W_f$. The resistances of both of these thermometers vary with temperature changes, in a well-known manner. The other two arms of the Wheatstone bridge M contain resistances 4 and 5 respectively, of a type not affected by temperature changes. The deflecting coil $g$ of the measuring or indicating instrument $K_1$ is arranged in that diagonal circuit $J_g$ of the Wheatstone bridge M which connects the junction point of the arms containing the resistance thermometers $W_t'$ and $W_f$ respectively with the junction point of the arms containing the resistances 4 and 5 respectively. Current is supplied to the two bridges at their other diagonals from any suitable source of electricity. A conductor D connects the junction point of the bridge arms containing the resistances 1 and 2 respectively with the junction point of the bridge arms containing the wet resistance thermometer $W_f$ and the resistance 5 respectively. Another conductor D' connects the junction point of the bridge arms containing the dry resistance thermometer $W_t$ and the resistance 3 respectively, with the junction point of the bridge arms containing the dry resistance thermometer $W_t'$ and the resistance 4 respectively. The two bridges M, R may be connected in parallel with the source of electricity, for instance a battery E having connections $e$ and $e'$ to the conductors D and D' respectively; or, as indicated by dotted lines, the two bridges may be connected in series, the battery E' being placed in one of the conductors D or D', it being understood that the parts E, $e$, $e'$ would be omitted in this case.

It will be evident that the current flowing through the diagonal branch or circuit $J_r$ including the directing coil $r$ varies with the resistance of the dry resistance thermometer $W_t$, while the current flowing through the diagonal branch or circuit $J_g$ including the deflecting coil $g$ is proportional to the psychrometric difference, that is to say, to the difference between the resistance of the dry resistance thermometer $W_t'$ and the resistance of the wet resistance thermometer $W_f$.

In order to obtain the best results, a proper choice of the several resistances is important. Preferably the arrangement is such that a current variation of from about 2 to 4 per cent. will result from every 1° centigrade of temperature variation. It has been ascertained empirically that the relation between the dry bulb temperature $T_t$, the relative humidity F (percentage of humidity), and the so-called psychrometric difference, $\Delta T$, may be expressed by the quadratic equation $$100-F=\frac{C.\Delta T}{A+T_t-BT_t^2}$$

in which A, B, and C are constants. For obtaining the best conditions for practical use, these constants are determined from limit conditions for the value of the directing current flowing in the branch or circuit $J_r$, which current varies with the dry bulb temperature. The curve shown in the graph, Fig. 1, is plotted according to a quadratic equation, the temperatures T being measured as abscissæ, while the ordinates indicate values of the current in the circuit $J_r$. The ratio of the resistances in the four arms of the Wheatstone bridge R is so chosen that at 0° centigrade, the current flowing in the diagonal branch or circuit $J_r$ will be equal to the constant A. The constant B which is the coefficient of the quadratic member of the equation given above, may be selected arbitrarily, within certain limits. This constant b becomes the smaller, the greater the temperature-independent resistances 1, 2, and 3 are in relation to the temperature-dependent resistance of the dry resistance thermometer $W_t$. The constant A may, if required, be varied by making the bridge more or less unsymmetrical at the initial temperature so that at this temperature, for instance $T_t=0°$ centigrade, a corresponding current will flow in the diagonal branch of the bridge (Fig. 1).

As will be gathered from the graph the current in the circuit $J_r$ varies more rapidly at relatively low dry bulb temperatures than at higher dry bulb temperatures. In order to obtain a correct compensation of the hygrometer indications by influencing the temperature of the dry resistance thermometer $W_t$, the resistances in the four arms of the bridge R are so chosen that when the temperature of the dry resistance thermometer $W_t$ varies by 1° centigrade, a variation of about 3 per cent., on the average, will take place in the directing current which flows through $J_r$, $r$. From known psychrometric measurements it follows that between 10 and 20° centigrade, for instance, the temperature coefficient of the directing current must on the average be 4.1 per cent. Between 20 and 30° centigrade this coefficient is according to psychrometer readings 3.1 per cent., while between 30 and 40° centigrade it must amount to 2.7 per cent. only. These coefficients are obtained with a Wheatstone bridge R in which, for instance, the variable resistance of the dry resistance thermometer $W_t$ amounts to 100 ohms at 0° centigrade, while the comparison resistance 1, in order to obtain, as stated above, a certain directing current at 0° centigrade, amounts to from 95 to 97 ohms and must be independent of the temperature. The two remaining resistances 2, 3 which are likewise independent of the temperature, should in this case preferably be given a value of 10 ohms each. When these value ratios are chosen for the resistances, the directing current will vary with the temperature in accordance with the curve shown in Fig. 1 of the drawing.

When the two bridges are connected in series with respect to the source of electric current (as indicated at E'), the apparatus will be absolutely unaffected by current variations.

It will be noted that the Wheatstone bridges M and R contain temperature-responsive variable resistances (one such resistance, that of the dry resistance thermometer $W_t$, for the bridge R, and two temperature-responsive variable resistances, those of the dry resistance thermometer $W_t'$ and of the wet resistance thermometer $W_f$ respectively, for the bridge M). By properly selecting the bridge arm resistances, as explained above, I may cause the directing current which flows in the branch or circuit $J_r$, to assume the desired values at a definite temperature variation and therefore at a predetermined change in the resistance of the dry resistance thermometer.

It will of course be understood that the three resistance thermometers $W_t$, $W_t'$ and $W_f$ are exposed to contact with the gas the relative humidity of which is to be determined.

Fig. 3 illustrates a modified embodiment of my invention in which the galvanometer coil $g$ of the cross-coil instrument $K_1$ is connected to the ends of a thermo-electric battery consisting of individual thermo-electric couples $e$. The soldered joints $t$ of the one side are "dry", that is to say, not kept moist by a wick or the like, while the soldered joints $f$ at the other side are covered with a wick or other textile fabric $d$ which is kept moist so that these joints will be under the influence of the so-called "wet-bulb temperature". The source of current E is here connected exclusively to one diagonal of the bridge R the other diagonal of which is connected to the directing coil $r$. The advantage of this arrangement resides in the simplicity of the wiring whereby the cost of manufacture is greatly reduced. However, owing to the fact that the two coils $g$, $r$ receive their current from independent sources, the accuracy of the measurements obtained with the arrangement shown in Fig. 3, is lower than in the design illustrated in Fig. 2 of the drawing.

In this second embodiment of my invention (Fig. 3), the same relation of resistances of the Wheatstone bridge R will be employed as in Fig. 2, and the cross-coil instrument may have a pointer P indicating on a stationary scale S as before. The soldered joints $t$ of Fig. 3 and the dry resistance thermometer $W_t$ are exposed to contact with the gas the relative humidity of which is to be determined. Such gas is also in contact with the soldered joints $f$ which are kept moist constantly, for instance by means of a wick $d$ one end of which dips into a suitable body of water. In hygrometers of the type referred to, the main requirement is to determine the difference between the readings or indications of two thermometers both constantly exposed to the gas under examination, and one of them kept wet constantly. It will thus be evident from a comparison of Figs. 2 and 3 that the "dry" soldered joints $t$ of Fig. 3 correspond in function to the dry resistance thermometer $W_t'$ of Fig. 2, while the "wet" soldered joints $f$ of Fig. 3 correspond in function to the wet resistance thermometer $W_f$ of Fig. 2. The only difference is that in Fig. 2 the bridge M containing the resistance thermometers $W_t'$ and $W_f$ in conjunction with the resistances 4, 5 and the source of current E or E', causes the production of a current proportional to the difference between the dry bulb temperature and the wet bulb temperature, while in Fig. 3 a current proportional to the difference between the dry bulb temperature and the wet bulb temperature (the temperatures at the "dry" soldered joints $t$ and the "wet" soldered joints $f$ respectively) is formed without the use of additional parts. The resistance thermometer $W_f$ of Fig. 2 and the soldered joints $f$ of Fig. 3 thus constitute "wet" elements the electrical condition of which varies with changes in temperature, while the resistance thermometer $W_t'$ of Fig. 2 and the soldered joints $t'$ of Fig. 3 constitute "dry" elements the electrical condition of which varies with changes in temperature.

I claim:

1. In a hygrometer operating on the psychrometric principle, a Wheatstone bridge one arm of which includes a "dry" element the electrical condition of which varies with changes in temperature, an electrical measuring instrument having two crossed coils, electrical connections for connecting one of said coils in a diagonal of said bridge to cause said coil to receive a current proportional to the varying electrical condition of said "dry" element, and a measuring circuit connected with the other coil, said measuring circuit including a "dry" element the electrical condition of which varies with changes in temperature and a "wet" element the electrical condition of which varies with changes in temperature, said elements of the measuring circuit being connected to cause the passage, through said other coil, of a current proportional to the varying difference between the electrical condition of the "dry" and the "wet" elements included in said measuring circuit.

2. In a hygrometer operating on the psychrometric principle, a Wheatstone bridge one arm of which includes a dry resistance thermometer, an electrical measuring instrument having two crossed coils, electrical connections for connecting one of said coils in a diagonal of said bridge to cause said coil to receive a current proportional to the varying resistance of said thermometer, and a measuring circuit connected with the other coil, said measuring circuit including a "dry" element the electrical condition of which varies with changes in temperature and a "wet" element the electrical condition of which varies with changes in temperature, said elements of the measuring circuit being connected to cause the passage, through said other coil, of a current proportional to the varying difference between the electrical condition of the "dry" and the "wet" elements included in said measuring circuit.

3. In a hygrometer operating on the psychrometric principle, a Wheatstone bridge one arm of which includes a "dry" element the electrical condition of which varies with changes in temperature, a measuring circuit including a "dry" element the electrical condition of which varies with changes in temperature and a "wet" element the electrical condition of which varies with changes in temperature, a measuring instrument, and electrical connections for influencing said instrument both by the current, proportional to the varying electrical condition of said "dry" element, flowing through a diagonal of said bridge and by the current in said measuring circuit, said elements of the measuring circuit being connected to supply to said instrument a current proportional to the varying difference between the electrical condition of the "dry" and the "wet" elements included in said measuring circuit.

4. In a hygrometer operating on the psychrometric principle, a Wheatstone bridge one arm of which includes a dry resistance thermometer, a measuring circuit including a "dry" element the electrical condition of which varies with changes in temperature and a "wet" element the electrical condition of which varies with changes in temperature, a measuring instrument, and electrical connections for influencing said instrument both by the current, proportional to the varying resistance of said thermometer, flowing through a diagonal of said bridge and by the current in said measuring circuit, said elements of the measuring circuit being connected to supply to said instrument a current proportional to the varying difference between the electrical condition of the "dry" and the "wet" elements included in said measuring circuit.

5. In a hygrometer operating on the psychrometric principle, a Wheatstone bridge one arm of which includes a dry resistance thermometer, the resistances of the bridge arms being so proportioned that a temperature variation of 1° centigrade will produce a variation of from 2 to 4 per cent. in the current in the diagonal branch of said bridge, a measuring circuit including a "dry" element the electrical condition of which varies with changes in temperature and a "wet" element the electrical condition of which varies with changes in temperature, a measuring instrument, and electrical connections for influencing said instrument both by the current, proportional to the varying resistance of said thermometer, flowing through said diagonal of the Wheatstone bridge, and by the current in said measuring circuit, said elements of the measuring circuit being connected to supply to said instrument a current proportional to the varying difference between the electrical condition of the "dry" and the "wet" elements included in said measuring circuit.

6. In a hygrometer operating on the psychrometric principle, a Wheatstone bridge one arm of which includes a dry resistance thermometer, an electrical measuring instrument having two crossed coils, electrical connections for connecting one of said coils in a diagonal of said bridge to cause said coil to receive a current proportional to the varying resistance of said thermometer, another Wheatstone bridge one arm of which includes a wet resistance thermometer and an adjacent arm of which includes a dry resistance thermometer, and electrical connections for connecting the other coil of said measuring instrument in a diagonal of said second Wheatstone bridge.

7. In a hygrometer operating on the psychrometric principle, a Wheatstone bridge one arm of which includes a dry resistance thermometer, an electrical measuring instrument having two crossed coils, electrical connections for connecting one of said coils in a diagonal of said bridge to cause said coil to receive a current proportional to the varying resistance of said thermometer, the resistances of the bridge arms being so proportioned that a temperature variation of from 2 to 4 per cent. in the current in the diagonal branch of said bridge, another Wheatstone bridge one arm of which includes a wet resistance thermometer and an adjacent arm of which includes a dry resistance thermometer, and electrical connections for connecting the other coil of said measuring instrument in a diagonal of said second Wheatstone bridge.

8. In a hygrometer operating on the psychrometric principle, a Wheatstone bridge one arm of which includes a dry resistance thermometer, an electrical measuring instrument having two crossed coils, electrical connections for connecting one of said coils in a diagonal of said bridge to cause said coil to receive a current proportional to the varying resistance of said thermometer, another Wheatstone bridge one arm of which includes a wet resistance thermometer and an adjacent arm of which includes a dry resistance thermometer, electrical connections for connecting the other coil of said measuring instrument in a diagonal of said second Wheatstone bridge, and a source of current common to both of said bridges.

9. In a hygrometer operating on the psychrometric principle, a Wheatstone bridge one arm of which includes a dry resistance thermometer, an electrical measuring instrument having two crossed coils, electrical connections for connecting one of said coils in a diagonal of said bridge to cause said coil to receive a current proportional to the varying resistance of said thermometer, a thermoelectric source of current having "wet" and "dry" soldered joints, and electrical connections from said source of current to the other coil of said instrument.

10. In a hygrometer operating on the psychrometric principle, a Wheatstone bridge one arm of which includes a dry resistance thermometer, an electrical measuring instrument having two crossed coils, electrical connections for connecting one of said coils in a diagonal of said bridge to cause said coil to receive a current proportional to the varying resistance of said thermometer, the resistances of the bridge arms being so proportioned that a temperature variation of 1° centigrade will produce a variation of from 2 to 4 per cent. in the current in the diagonal branch of said bridge, a thermoelectric source of current having "wet" and "dry" soldered joints, and electrical connections from said source of current to the other coil of said instrument.

HEINZ GRÜSS.